US007180405B2

(12) United States Patent
Foster et al.

(10) Patent No.: US 7,180,405 B2
(45) Date of Patent: Feb. 20, 2007

(54) INTERACTIVE COMMUNICATION AND DATA PROCESSING SYSTEM FOR RESTAURANT SERVICES

(76) Inventors: Stanley E. Foster, 1940 Tranquility La., P.O. Box 2344, Titusville, FL (US) 32781-2344; Tom Burns, 268 E. Long Creek Cove, Longwood, FL (US) 32750

( * ) Notice: Subject to any disclaimer, the term of this patent is extended or adjusted under 35 U.S.C. 154(b) by 0 days.

(21) Appl. No.: 10/962,318

(22) Filed: Oct. 12, 2004

(65) Prior Publication Data

US 2005/0046548 A1    Mar. 3, 2005

Related U.S. Application Data

(62) Division of application No. 10/065,534, filed on Oct. 28, 2003, now Pat. No. 6,831,549.

(51) Int. Cl.
*G08B 9/00*    (2006.01)

(52) U.S. Cl. ............................ 340/286.09; 340/286.02; 340/286.06; 700/216

(58) Field of Classification Search ........... 340/286.09, 340/286.02, 286.06; 700/213, 216
See application file for complete search history.

(56) References Cited

U.S. PATENT DOCUMENTS

2002/0038165 A1*    3/2002    McHale et el. ............. 700/216

* cited by examiner

*Primary Examiner*—Julie Bichngoc Lieu
(74) *Attorney, Agent, or Firm*—Joel I. Rosenblatt

(57) ABSTRACT

An interactive local and wide area network system is for communications between the restaurant service elements providing service to a customer and for recording of selected related service data for real time information and for review and analysis and for management control. The wide area network uses distributed data processing for the collection and analysis of related area wide restaurant operations for use in management and control.

16 Claims, 3 Drawing Sheets

INTERACTIVE COMMUNICATION AND DATA PROCESSING SYSTEM FOR RESTAURANT SERVICES

This is a divisional application of application of application Ser. No. 10/065,534, filed on Oct. 28, 2002, now U.S. Pat. No. 6,831,549.

FIELD OF THE INVENTION

This invention relates to the improvement of customer service in restaurants and for other on site services.

BACKGROUND OF THE INVENTION

Often times, patrons in a restaurant require service to change their order, refill their drink or for some other need requiring assistance. Getting the server's attention can be a challenge in some modern restaurants. Visibility, noise and other factors often impair the ability of patrons to get the assistance they may need in a timely fashion.

In the past, some restaurants implemented a service call system by installing a lamp or bell at each dining table. One system used a lamp installed on each table. If patrons need service, they could turn the lamp on at their table to indicate to the server that something was needed. The server would then go to the table and assist the patrons. While this method of calling for service was effective at that restaurant, it is impractical in most modern, upscale restaurants due to visibility and privacy issues. Additionally, the problem of installing wiring to each table to power the lamp is not practical in many modern restaurant facilities.

In a system, as shown in U.S. Pat. No. 6,366,196, a wireless waiter paging system included a plurality of table transmitters which transmitted a 'waiter call' signal, a central unit which received the 'waiter call' signal from the table transmitter and relayed the 'waiter call' signal, and a plurality of waiter pager units, associated with a set of tables, which receive the 'waiter call' signal from the central unit. The pager unit notifies the waiter via a vibrator or buzzer that a request has been received and displays the request. In a second embodiment, there is no central unit. Rather, the waiter pager units receive the 'waiter call' signal directly from the table transmitters.

U.S. Pat. No. 6,253,090 shows a communication apparatus, as used in hospitality establishments such as restaurants or the like, comprising a network of transmitters and receivers communicating with each other by means of UHF radio frequency signals. Each transmitter is linked to one or more associated receivers and can be individually activated to transmit a selected one of a number of different predetermined messages to its associate receivers along a corresponding communication channel. Each transmitter is placed in an active state by means of a respective message selector, which enables a user thereof to select the predetermined message to be transmitted by the transmitter.

U.S. Pat. No. 5,838,798 shows a restaurant transaction processing system and method which includes portable computing devices and which employs cordless telephone transceivers for wirelessly transmitting orders.

However, while improving customer communications and organization of services, these devices are not designed to assist restaurant customers when they have need for service, while, at the same time, assisting management by providing direct oversight of on-site operations, interactive communications with the customers, or tracking calls from customers and providing statistical information about the cost efficiency of the operation.

SUMMARY OF INVENTION

The deficiencies described above are solved by the invention, as disclosed herein, that is designed to be easily installed in any restaurant or on-site service environment, either at the time of new construction or after the restaurant has opened for business. It has as its objectives, elimination of direct line of sight for communication between a server and table or the installation of wiring. It provides a means for management to see and track the number and types of calls for service, allowing improvements to be made and helping to prevent dissatisfied customers from leaving the restaurant without the manager being aware that there has been a problem.

The invention is described as an Interactive Communication and Data Processing System for Restaurant Services, comprising hardware and software components and operates as a system for calling for service, in a hospitality setting, such as for example in restaurants.

The System is designed for operation in a restaurant environment or other on-site service environment to assist customers when they have need for service. It also assists management by tracking calls from customers and providing statistical information about the timeliness or cost efficiency of services rendered. It is designed to be easily installed in any restaurant environment, either at the time of new construction or after the restaurant has opened for business.

In a preferred embodiment of the invention, as disclosed according to its inventive principals, the invention comprises a data processing system, using hardware and software components as may be commercially available. However, the inventive principles are not limited to currently available technology but may be used with any interactive communication and data processing technology now in use or which may be developed for processing any form of information in a form translated or translated from a human perceptible form into a form which can be processed electronically or by means of light or other means now in existence or hereafter developed, for processing and transmission and for translation back into human perceptible form.

The inventive system employs a plurality of customer call units, placed around the service area, for example on the diners' respective tables. Each call unit includes a transmitter for interactive communication with the portable response units carried by servers. The communication may be by radio frequency as disclosed for a preferred embodiment or any other means of remote communication now or hereafter developed. With the call units and the portable response units, the system employs as a base station, a central processing unit and may include a smaller unit such as for example a notebook or other computer device which may be used to access and copy the base station stored information and for processing the information.

In a preferred embodiment, as shown and described, the system comprised of the data processing unit, the call units, the portable response units, a unit allocated to a food processing area or other service area, and the central processing unit or base station, are assembled using available data processing and communications hardware and software programs, as would be known by those skilled in the art. However, the disclosed principals of the invention are not limited by state of the art communications devices or techniques or computer processing devices and operating software, but extend to any device now or hereafter conceived or reduced to practice and which performs the functions and methods of the disclosed inventive principles.

The inventive system operates responsively to a request for service. The service request from the call unit is transmitted directly to a server response unit or to the central unit, which responsively processes the request to produce a signal, such as for example, as shown in the disclosed preferred embodiment, an indication on the central unit display or on a response unit display, identifying the call unit or table unit transmitting the request. A server response then may be transmitted from the base unit, or from the portable response unit, which may be carried by the server or placed at a convenient location. The response may be to acknowledge the call, with the server being able to transmit a separate message responsive to the call unit message and providing an answer to the call unit request. The call unit and the response unit to indicate the call is acknowledged. Each of the units operates to clear the messages once the responsive messages have been transmitted and received.

The central part of the system is the base unit which is used to monitor and manages the communication between the table call units, server response units and any external computing or data processing device. However, as would be understood by those skilled in the art, the functions of the central base station unit or a data processing unit for processing the data received or collected in the central unit is not essential to the practice of this invention as, and as would be known to those skilled in the art, the functions of the central base station unit may be distributed to one or more of the computer processes used in the total system, without departing from the principles of the disclosed invention.

The system operates according to the disclosed inventive principles, by processing each call or request and response to produce information about the restaurant operation which may be stored for access and use by management to analyze restaurant operation, over the long term or to correct any immediate or short term situations in the real time operation of the services, such as a neglectful waiter, or misdirected food orders.

Each of the call units may be preprogrammed with standard messages or may contain a key pad or voice actuated software, permitting the customer to encode a custom message for transmission and display at the base or server response units, as would be known to those skilled in the art of text messaging.

According to a preferred embodiment, as disclosed herein, the system software includes error correction functionality, as would be known to those skilled in the art, to eliminate lost or garbled transmissions or displayed information from the processed data.

The data transfer to another data processing computer, whether located in proximity to the system or distributed through a wide area network to a remote location, may be stored and then processed by a statistical data processing program to compile statistically ordered data related to key functions of the restaurant operation.

The system may be assembled from known and available components, as would be known to those skilled in the art. The wireless connection between each of the SNS units may be by an RF link using TDMA (Time Division Multiplexed Addressing), allowing one time slot for each call unit and permitting the separate identification of each call unit. In a preferred embodiment, and without limiting the principles of the disclosed invention, up to 250 SNS call units may be placed throughout the restaurant, one per table. It may be a stand-alone device, or designed in such a way as to be physically a part of the table or a service connected device on the table such as for example, condiments tray.

Additionally, each call unit software program will be arranged to generate a unique identifier, which will, with its assigned time slot, identify the table call unit for the base unit and server response unit.

Some of the benefits achieved by the disclosed system are, Customer Benefits: Immediate initial recognition of presence and initial service; More efficient service; Quicker service; Instantaneous medium to summon server; Instantaneous medium to place orders, change orders, request specific items and/or services without having to speak directly to a server; Real time immediate notification of bar orders without the server having to spend time and effort physically turning orders into the bartender with real time response from the bar letting the server know that the drinks are ready to be served; Instantaneous responses to all requests letting customer know that his requests have been noted and are being expediently implemented; Greatly reduce waiting time to pay bill and leave; Enhancement of overall dining experience.

Individual Local Restaurant Benefits: Automated enhancement of ways and means to coax customers to order additional menu items and advise them of daily specials without tying up restaurant personnel; Enhancement of customer satisfaction and contentment; Enhancement of repetitive customer patronage; Reduced turn-around time of table availability; Enhancement of managerial procedures and practices; Enhancement of Operational Procedures and Practices; Instant and/or shared messaging between customers, servers, kitchen, bar, and management; Increased Corporate Sales and Profits through enhanced record keeping and tracking of statistical service; response times, team work (or lack thereof and employee performance data that may be used to improve service, operational procedures, efficiency, cut wasted efforts, cut expenses, and increase sales and profits.

Corporate/Multi-locations Benefits: Enhanced upper-level managerial multi-location data collection capability; Enhancement of Managerial Procedures and Practices; Enhancement of Operational Procedures and Practices: Increased Corporate Sales and Profits; Increased Corporate Sales and Profits through comparisons of all restaurant locations resulting in corporate directives by overseeing and fostering enhanced record keeping and tracking of statistical service, response times, team work (or lack thereof) and employee performance data that may be used to improve service, operational procedures, efficiency, cut wasted efforts, cut expenses, and increase sales and profits.

The features and functions of the disclosed invention according to its disclosed inventive principles are described in the following. As would be understood by those skilled in the art or as described herein, the components for constructing or operating the described system or method are known to those skilled in the art and the particular components, programming or systems constructed, as now known or developed in the future, to practice the disclosed invention, would be known to those skilled in the art and are not to be seen as limiting the disclosed inventive principles.

Described according to the disclosed inventive principles and as a separate system, a wide area network restaurant communication and control system for data collection and analysis by a wide area base central processing unit connected in the wide area network to separate respective restaurant locations, of data recorded from the operation of interactive communications between a customer communications unit, a server communications unit, a meal processing center communications unit, or a central management unit, by a respective central base unit at the respective restaurant locations, and for creating a data base record of wide area restaurant operations and for data processing and analysis for overview and improvement of the wide area restaurant operations. As would be understood by those skilled in the art, the wide area network may include a) first means for central wide area data processing for the wide area network for storing recorded data from a plurality of separate respective restaurant locations, indicative of the respective times a location is occupied, or the times of respective service request and of the associated responses, or the number of service requests, or the frequency or times of interactive communications with a respective server unit or food processing unit; b) the first means including means for storing as data, standards for respective times a location is occupied, or the times of respective service requests and of the associated responses, or the number of service requests, or the frequency or times of interactive communications with a respective the server unit or with a respective the food processing unit, for a plurality of separate respective restaurant locations; c) the first means including third means for comparing a data set comprising the data from the recorded data for at least a plurality of selected respective restaurant locations with at least one of the standards and for producing data indicative of the comparison.

Within the wide area network, as disclosed and without limiting the disclosed inventive principles, the first means stores as recorded data, data indicative of the time duration a table is occupied at the separated respective restaurant locations and the means for storing as data, stores standards for the time duration a table is occupied by a customer and the third means for comparing, compares a data set for at least a plurality of the separate respective restaurant locations with at least one the standard for producing data indicative of the comparison. As a disclosed part of the wide area network, the first means for wide area data processing includes data base means for storing data indicative of selected indicia of restaurant operations and for arranging the data for comparison with data indicative of standards for separate respective restaurant locations, by time, or location, or climate parameters, or type of restaurant, or customer data.

The interactive restaurant communication and control system, operates by a) enabling interactive communication from a customer unit; b) enabling interactive communications with a server unit; c) establishing interactive communication with a central base unit; d) selection of a prerecorded message and voice or keyed messages for transmission between the customer unit, the central base unit or the server unit; e) recording selected data from respective communications; f) analyzing the selected data for management of restaurant services, and the step of analyzing includes the step of comparing a selected set of the selected data with operating standards stored as data and producing data indicative of the comparison.

What is shown and described according to the inventive principles is an interactive restaurant communication and management system for operation of, and managing the, interactive communications between a customer, server, meal processing center, or central base unit, for collecting data of selected functions related to restaurant services, for controlling selected services and for creating a data base record of restaurant operations for data processing and analysis, for overview and improvement of the restaurant operations, comprising interactive communication from a customer location; interactive communications with a server; operation of a central base unit and including interactive communications with a server or customer location, with selection of a prerecorded message, or voice, or keyed messages for transmission to the server or the central base unit and with the central base unit recording selected data responsive to the interactive communications, for analysis of the selected data related to one or more selected restaurant services; and, a wide area network for connecting a plurality of central base units displaced from each other at respective remote locations for data transfer from a plurality of central base units; and said wide area network including a wide area central processing unit for processing of the data.

What is shown according to the disclosed inventive principles is an interactive restaurant communication and management system for operation of, and managing the, interactive communications between a customer, server, meal processing center, or central base unit, for collecting data of selected functions related to restaurant services, for controlling selected services and for creating a data base record of restaurant operations for data processing and analysis, for overview and improvement of the restaurant operations, comprising, interactive communication from a customer location; interactive communications with a server; a central base unit and including interactive communications with the customer location or server, selection of a prerecorded message, or voice, or keyed messages for transmission to the central base unit or the server; the central base unit recording selected data responsive to said interactive communications; and, a wide area network for connecting a plurality of the central base units displaced from each other at respective remote locations for data transfer of selected data from the plurality of central base units, and with the wide area network including a wide area central processing unit for receiving, and for processing or analysis of, the selected data related to one or more selected restaurant services.

Disclosed is a method for interactive restaurant communication and management for operation of, and managing the, interactive communications between a customer, server, meal processing center, or central base unit, for collecting data of selected functions related to restaurant services, for controlling selected services and for creating a data base record of restaurant operations for data processing and analysis, for overview and improvement of the restaurant operations, comprising the steps of, interactively communicating between a customer location, or a server, or a central base unit; the step of interactively communicating includes the step of selecting a prerecorded message, or voice, or keyed messages for transmission to said third means central base unit or said second means; recording in a central base unit selected data responsive to the interactive communications, for processing of the selected data related to one or more selected restaurant services; and, connecting in a wide area network, a plurality of the central units displaced from each other at respective remote locations for data transfer of the selected data from the plurality of the central base units; and a wide area central processing unit for receiving, and for processing or analysis of, the selected data related to one or more selected restaurant services These and other benefits of the disclosed invention will be apparent to those skilled in the art upon reading the following description of the invention along with the accompanying drawings.

DESCRIPTION

Figure 1:
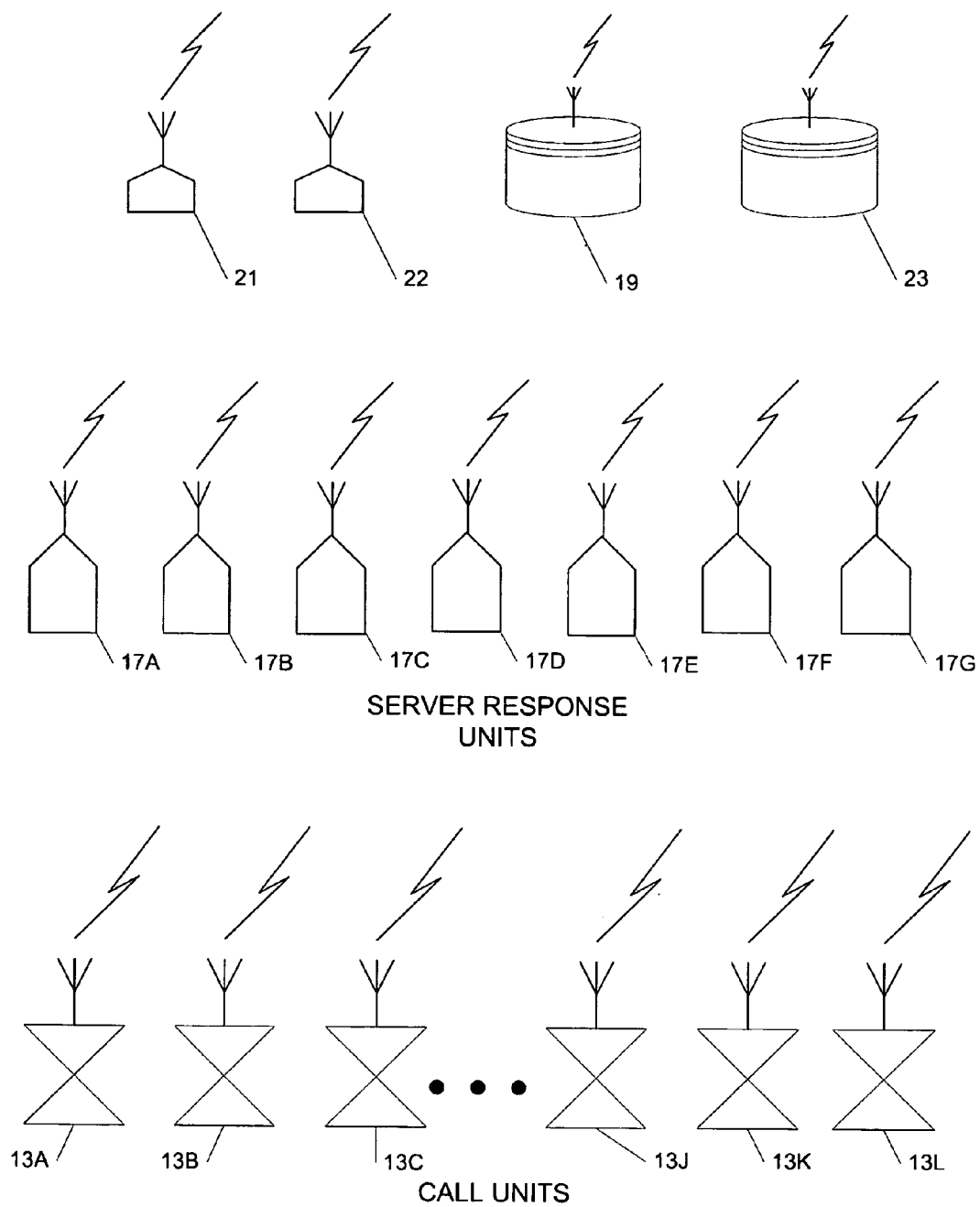
FIG. 1 shows in schematic form, the components of the restaurant communication system, disclosed in a preferred embodiment as connected, by wireless communications.
Figure 2:
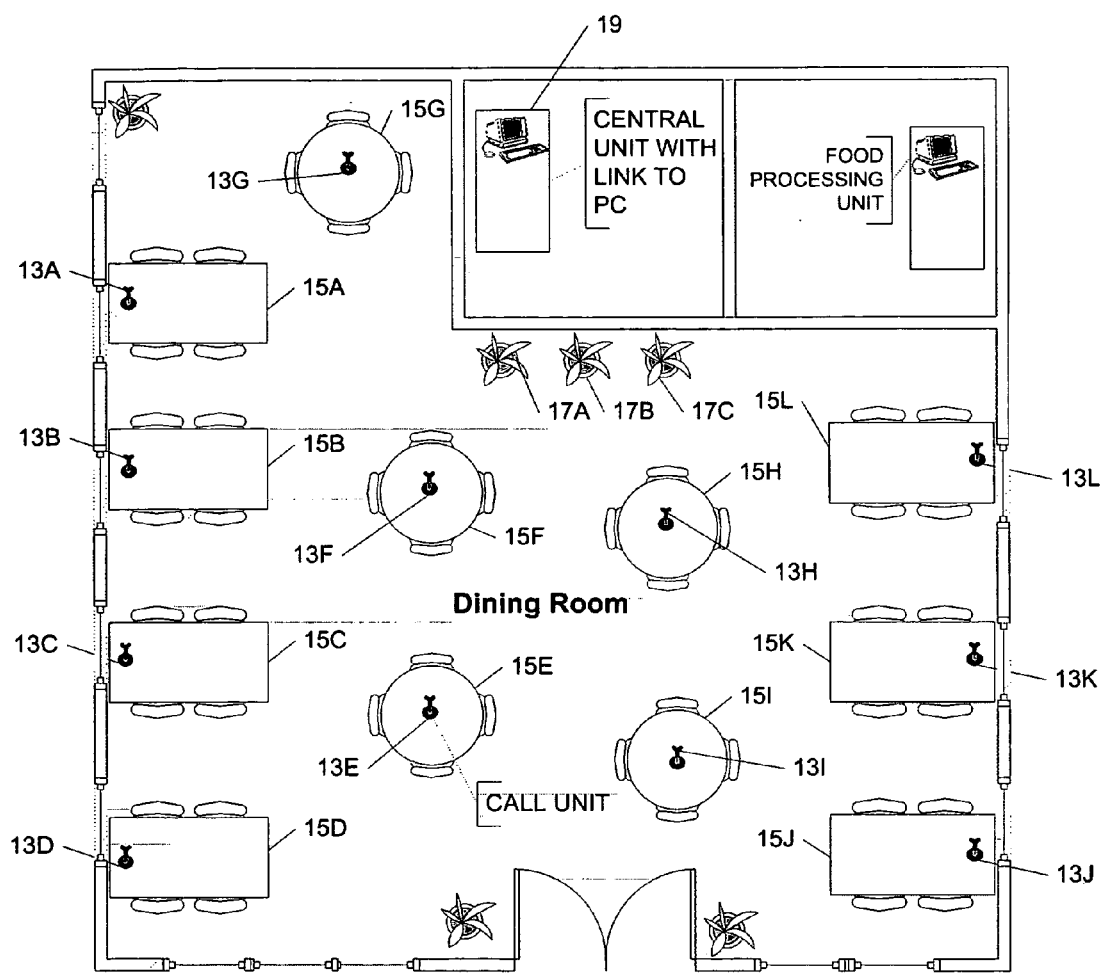
FIG. 2 shows in schematic form a preferred embodiment of the disclosed systems arranged in a restaurant setting.

As shown in FIG. 1 and in FIG. 2, the disclosed invention as shown in a preferred embodiment generally described in by numeral 11, comprises a plurality of means for calling or call units 13A to L, one on each dining table 15A to L. Each of the call units 13 will include a data processor and transmitter/receiver for receiving information from the customer in the form of an original message or as a selection of a prerecorded message, for processing and transmission of the customer information to a means for central processing or central processing unit 19, a food processing unit 21, and to a means for server response or server unit, shown schematically as units 17A to G, associated with the server assigned, or designated for service, to the table 15A to L, and respective call unit, 13A to L.

Operation The disclosed invention allows restaurant patrons at a given table to communicate with a respective server or to the central unit. In a preferred embodiment, all communications from a call unit 13 to a server unit 17 will be received by the central unit 19 and may be received by the food processing unit 21, for the purpose of monitoring the service requests and responses, for building a data base which may be processed for the purpose of analyzing restaurant operations and for intervening in the spontaneous communication occurring between the customer call unit and the server's server unit or for communication directly with the customer through the customer call unit or directly with the server through the server unit.

The call unit may include a Table Active message, which can be active for transmission to the central unit and to the respective server, when the customer is seated. This provides an indication to the server a customer is ready for service and to the central unit that a table is occupied and the restaurant operation for that table has begun. The server indication may be received directly from the call unit or from the central processor which may poll each of the server's status and select a server for that respective call unit table based on individual server loading of orders, or items ready for delivery, or tables assigned or the time proximity for respective server optimal delivery of prepared dishes, in accordance with the restaurant quality standards or other arrangements which make optimal use of server resources and food delivery, without departing from the disclosed principals of the invention.

While the call unit may be programmed with prerecorded messages, the unit includes a keyboard or other suitable input device allowing the customer to create and transmit an original message to the server unit or to the call unit. Each of the messages sent from a call unit will included means for identifying the table and the server and may include may include the following, as examples. Unit ID number (table number or response group number;) Type of call, such as: ready to order; Want to change order; Need napkins; Need silverware; Need salad dressing: Need butter Need bread; Need condiments (catsup, mustard, steak sauce); Need water; Need ice; Need drink refill; Ready for main course; Plate is dirty; Food is cold; Salad plate is warm; Need assistance; Ready for dessert; Need check; Please return my credit card; Waiting to leave; Unit health status such as temperature of battery voltage.

The server unit may be preprogrammed for immediate response to acknowledge the call unit's message and may include prerecorded messages which may be sent to the call unit to indicate the particular response intended, which may be customized for the particular restaurant and its customers. If more than prerecorded messages are required in any particular instance, the call unit and server response unit may include means for voice communication so the customer may communicate directly with the respective server, at any time and where the server is located.

Over the call unit, server response unit, and food processing unit, is the means for central processing or the central unit. The purpose of the central unit is for management overview and control of the restaurant operations. It may include a communications link to the head waiter, wine steward or chef charged with food preparation, to allow each to communicate directly with the customer and to heighten the enjoyment of the customer dining experience.

Communication of all calls for service and all responses to those calls will be made secure by the system's software and error correction methods. Each unit in the system will contain a bi=directional transceiver that will send an initial signal and wait for an acknowledgment from the destination device. If any message does not receive an acknowledgment, it will automatically be resent until acknowledged. This insures that any call for service is received.

Data transfer to a data processor, may be included within the system. This part of the system allows separate processing the on-site data by itself or with other remote service operations and allows local LAN or wide area WAN operations to be statistically viewed by management, either at the restaurant level, or by senior management at the regional or national level. Trends and deficiencies may then be tracked at the local and regional levels and corrective action may be taken to insure a certain level of service is being provided.

Statistical information that can be tracked and displayed on a desktop PC may include: Frequency and times of each type of call; Response time to satisfy each call and/or each type of call; Trends in increasing need for voice communications between the management, servers, or food processors, compared to a disproportionate lesser, increasing, or flat or decreasing revenues, indicative of misunderstandings that identify possible deficiencies with a given server's performance and/or call response time, food service or management inefficiencies; Trends in site operation such as room temperatures, use of restrooms, turnover time of tables, times of day in which more or fewer calls take place, times of day in which timeliness of responses is greater or less, or a particular type of call being more or less frequent.

In a preferred embodiment, analysis based on the collected data is used to provide information regarding accuracy of orders, general attentiveness of server(s), number and types of mistakes, and timeliness of handling payment/ visit termination and for improving the cost efficiency of the on site service.

As disclosed for a preferred embodiment, the system may be implemented using commercially available hardware, software and communications. The call unit may be, for example, battery operated with an RF link to the base unit. This RF link may be TDMA (Time Division Multiplexed Addressing), allowing one time slot for each call unit. In a preferred embodiment, up to 250 call units may be placed throughout the restaurant, one per table. However, as will be recognized by those skilled in the art, the invention or the inventive principles are not limited to the number of call units. The call unit may be a stand-alone device, or designed in such a way as to be physically a part of the furnishings.

Each call unit for example, may consist of an 8-bit or 16-bit micro-controller such as the Texas Instruments MSP430, one or more switches, a light source such as a bulb or LED to provide indication to the users at the table, and an RF transceiver such as the XE1202 from Xemics. The transceiver will be a low-cost type, operating in the 915 MHz or other ISM frequency band. To help eliminate RF interference, the transceiver may operate using a frequency hopping spread spectrum scheme. Additional features may be included in the call unit, for example, a key board or voice activated software allowing the customer to sent an original message to the central unit, food processing unit or to the server.

The system comprises a local area network (LAN) and a wide area network (WAN), which include the system functions performed on site or area wide among a plurality of remote locations, respectively.

The local area network LAN may include the on site call units, server units, central or base unit, the food processor unit and a local data processing unit which may be separate or within the central unit, as would be known to those skilled in the art. The functions included within the LAN may include the following operational functions as related to data collection or customer service.

Upon clearing a table, the service personnel may use the table call unit to notify the central unit the table is ready for service. The base unit may be programmed to record the time and table location and provide an indication to management of table ready as would be known to those skilled in the art, for example on a visual display, which may be arranged to display on a screen the site table layout and the occupied or unoccupied tables. The call unit may be used in a similar way to notify the central unit when a diner is seated at the table with the central unit recording the relevant information, for example, the location, time, or number in the party. This information may be transmitted from the call unit or the server response unit or may be entered directly into the central unit.

Depending on the type, kind or style of restaurant, there may be a plurality of server visits, each of a separate respective nature and each intended for a separate particular purpose. For example, a restaurant may plan to provide visits from a host or server to welcome the diner and to take any preliminary orders or questions or to make the diners feel their presence has been acknowledged. The attendance of a server or a wine steward may be scheduled and their respective visits may be notified to the central unit and recorded as to time, and location. The interactive capability of the call unit may permit the diner to communicate directly with the food processor to answer any questions about any dish or its preparation. All such communications may be recorded by the central unit for later use in analyzing the restaurant services.

In addition to the capability for full interactive communications using voice or a keyboard input for example, the call unit, as described above includes prerecorded message, which may be selected by the customer and sent to the server. All of the information relevant to any communications made between the customer, the server, and the central unit, and the response, if any, may be recorded for data processing and analysis.

In accordance with the disclosed invention, the interactive communications, for example between the food processor and wine steward and the customer may add to the sense of personal attention received by the diner, as for example the diner is alerted to the start of preparation of the chosen item or the food processor notifies the diner of the choices available in the preparation of the dish and diner is able to give on the spot instructions, with confidence the diner is receiving personal attention.

The functions of interest and relevant data collected in the central unit, according to the disclosed principles of the invention, may be: Time in use by table, by server, by food served, down to the time taken for the order, the appetizer, the entree, and desert, to the time the table is again ready for service; The prerecorded messages sent from a table unit and the response times by the server, including the number of repeated messages; The diner's choices by table, server, amount of total bill, and the sale of high margin items, such as for example beverages and desserts; The diner's wine choice if any, which may be processed into the wine inventory to alert management of wine turnover and popularity; The time duration spent in communication with the tables by the food processor or wine steward, by items ordered; The items ordered which may be used to revise the food inventory as to its current position and ordering requirements; The loading of assignments upon each of the servers, by orders in process, tables being served, food items place on order or waiting for delivery, server requests or communications in process, or any other task in the purview of server work assignments.

All of the collected data may be used within the LAN data processing system of the central unit or by a WAN distributed data processor to analyze the service operation for trends in any of the recorded data, for example to analyze cost trends or preference trends of the customers or for cost efficiency. In a similar way, the data from each LAN may be sent through a WAN to a central location for data processing, in place of using the central unit on site for on site analysis or for analysis of a plurality of remote operations for a composite wide area system analysis.

The analysis of the data by the central processor in the LAN or QAN, may be by comparison to standards recorded as data, for restaurant operations or services, by a central processor at a remote restaurant location, or by the WAN central processor for selected remote restaurant locations. The data or data sets selected for processing may be selected by respective operations or services or by selected restaurants and wherein the selected data may be compared to respective standards for the services or operations for individual restaurants by a LAN central processor or one or more remote restaurants by a WAN processor.

Figure 3:
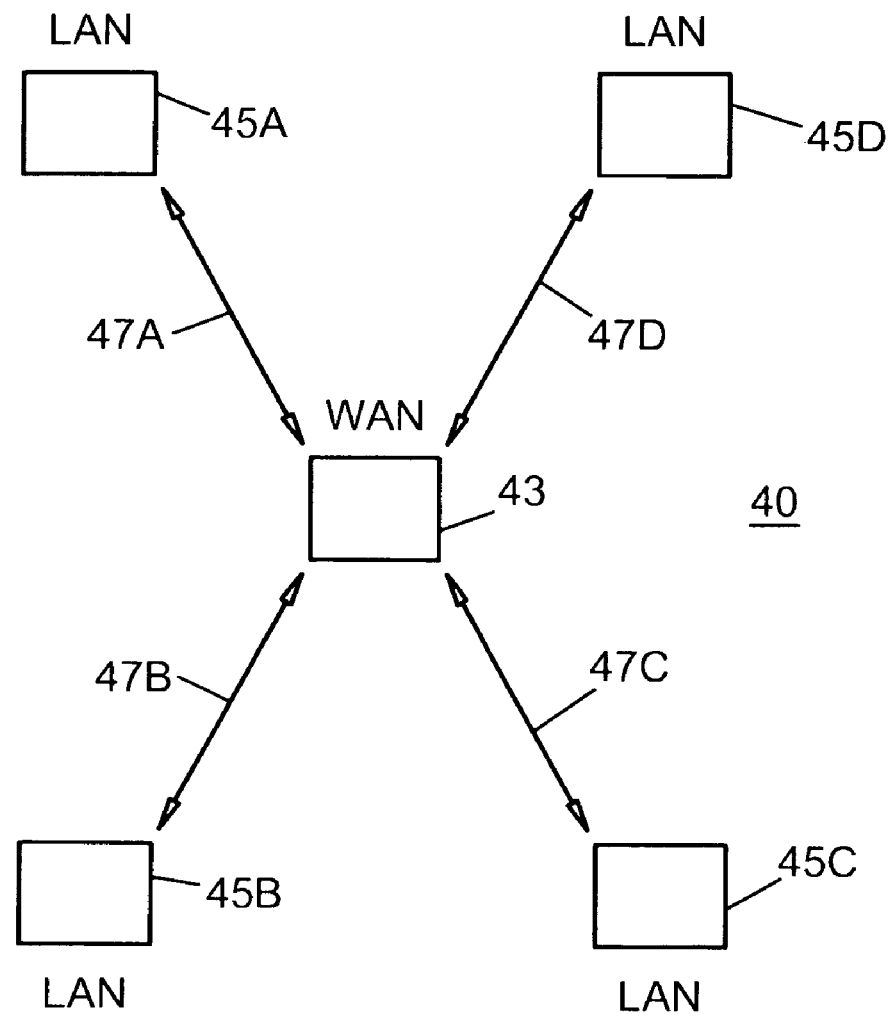
FIG. 3 shows in schematic form, a representative wide area network with distributed data processing and connecting separate respective restaurant locations, each with the disclosed inventive system.

The wide area network or WAN is shown in FIG. 3, generally by numeral 40. The central wide area network process unit is shown by numeral 43 connected to the separate respective LANS in restaurant locations 45A, 45B, 45C, and 45D, connected into the network by respective communications links 47A, 47B, 47C, and 47D. As would be understood by those skilled in the art, the number of central processors used in the WAN or locally in respective restaurant LAN's does not affect the disclosed inventive principles or disclosed inventive operation.

The central data processing units may be used to analyze the recorded data in real time and provide alert messages to management for some of the more important restaurant customer service related functions, for example, time of service and server response times, duration any table has been occupied.

As would be understood by those skilled in the art, the described and claimed invention is not limited to a preferred embodiment but comprises any system or method performing the claimed functions or steps, whether now in existence or developed hereafter.

The invention claimed is:

1. An interactive restaurant communication and management system for operation of, and managing the, interactive communications between a customer, server, meal processing center, or central base unit, for collecting data of selected functions related to restaurant services, for controlling selected services and for creating a data base record of restaurant operations for data processing and analysis, for overview and improvement of the restaurant operations, comprising,
   a) first means for interactive communication from a customer location;
   b) second means for interactive communications with a server;
   c) third means for operation as a central base unit and including means for interactive communications with said first means or said second means;
   d) said first means including means for selection of a prerecorded message, or voice, or keyed messages for transmission to said third means central base unit or said second means;
   e) said third means for operation as a central base unit including means for recording selected data responsive to said interactive communications;
   f) means for a wide area network for connecting a plurality of said third means for operations as central base units, displaced from each other at respective remote locations for data transfer of said selected data from said plurality of said third means central base units, including wide area central processing unit for receiving, and for processing, or analysis, of said selected data related to one or more selected restaurant operations or services; and
   including means for storing or accessing standards and means for comparison of one or more of said standard with said selected data and producing comparison data said wherein, said comparison data includes data indicative of at least a trend related to one or more of said respective operations or services.

2. The system of claim 1, wherein said at least one said standard is a standard indicative of a maximum time for table use or turnover.

3. The system of claim 1, wherein said selected data is indicative of one or more, interactive communications at a separate respective restaurant location, between a customer communications unit, a server communications unit, a meal processing center communications unit, or a central management unit.

4. The system of claim 3, wherein said selected data is indicative of time of customer ordering, or of respective customer items ordered and time of delivery of said respective customer items, and said respective standard is indicative of a maximum delivery time or a maximum response time.

5. The system of claim 1, wherein, said comparison data includes data indicative of at least a trend for at least one of said separate respective remote locations.

6. An interactive restaurant communication and management system for operation of, and managing the, interactive communications between a customer, server, meal processing center, or central base unit, for collecting data of selected functions related to restaurant services, for controlling selected services and for creating a data base record of restaurant operations for data processing and analysis, for overview and improvement of the restaurant operations, comprising,
   a) first means for interactive communication from a customer location;
   b) second means for interactive communications with a server;
   c) third means for operation as a central base unit and including means for interactive communications with said first means or said second means;
   d) said first means including means for selection of a prerecorded message, or voice, or keyed messages for transmission to said third means central base unit or sad second means;
   e) said third means for operation as a central base unit including means for recording selected data responsive to said interactive communications;
   f) means for a wide area network for connecting, a plurality of said third means for operations central base units, displaced from each other at respective remote locations for transfer of said selected data from said plurality of said third means central base units, including a wide area central processing unit for receiving and for processing, or analysis of said selected data related to one or more selected restaurant operations or service, and
   said means for a wide area network includes means for storing or accessing standards indicative of standards for the time periods of table, or location occupancy, or for respective kinds of service requests or responses, or billing amount, or kinds of food items ordered, or the number or frequency of communications between a customer communications unit, a server communications unit, a meal processing center communications unit, or a central management unit, by a respective central base unit, at one or more of said respective remote locations; and
   means for storing or accessing real time data from, said one or more of said respective remote locations, indicative of said time periods of table, or said location occupancy, or for said respective kinds of service requests or responses, or said billing amounts, or said kinds of food items ordered, or said number or frequency of communications from, between a customer communications unit, a server communications unit, a meal processing center communications unit, or a central management unit, by a respective central base unit, at said one or more of said respective remote locations; and
   means for storing or accessing real time data from said one or more of said respective remote locations, indicative of said time periods of table, or said location occupancy, or for said respective kinds of service requests or responses, or said billing amounts, or said kinds of food items ordered, or said number or frequency of communications from, between a customer communications unit, a server communications unit, a meal processing center communications unit, or a central management unit, by a respective central base unit, at said one or more of said respective remote locations.

7. The system of claim 6, including means for comparison of one or more of said standards with said real time data and means and producing comparison data and wherein,
   said third means for comparison, includes means for producing data indicative of trends in said real time data.

8. The system of claim 7, wherein, said comparison data includes data indicative of at least a trend for at least one of said separate respective restaurant locations.

9. A method for interactive restaurant communication and management for operation of, and managing the, interactive communications between a customer, server, meal processing center, or central base unit, for collecting data of selected functions related to restaurant services, for controlling selected services and for creating a data base record of restaurant operations for data processing and analysis, for overview and improvement of the restaurant operations, comprising the steps of,
   a) interactively communicating between a customer location, or a server, or a central base unit;
   d) said step of interactively communicating includes the step of selecting a prerecorded message, or voice, or keyed messages for transmission to said third means central base unit or said second means;
   e) recording in a central base unit selected data responsive to said interactive communications, for processing of said selected data related to one or more selected restaurant services; and
   f) connecting in a wide area network, a plurality of said central units displaced from each other at respective remote locations for data transfer of said selected data from said plurality of said central base units; and a wide area central processing unit for receiving, and for processing or analysis of, said selected data related to one or more selected restaurant services; and
   the steps of,
   storing or accessing standards;
   comparing one or more of said standards with said selected data and producing comparison data indicative of at least a trend related to one or more of said respective operations or services.

10. The method of claim 9, wherein said step of storing or accessing standards, includes the step of storing or accessing at least one said standard indicative of a maximum time for table use or turnover.

11. The method of claim 9, wherein said step of recording selected data includes the step of recording said selected data is indicative of one or more, interactive communications at a separate respective restaurant location, between a customer communications unit, a server communications unit, a meal processing center communications unit, or a central management unit.

12. The method of claim 9, wherein said step of recording selected data includes the step of recording said selected data indicative of time of customer ordering, or of respective customer items ordered and time of delivery of said respective customer items, and said respective standard is indicative of a maximum delivery time or a maximum response time.

13. The method of claim 9, wherein said step of producing comparison data, includes the step of producing data indicative of at least a trend for at least one of said separate respective remote location.

14. A method for interactive restaurant communication and management for operation of, and managing the, interactive communications between a customer, server, meal processing center, or central base unit, for collecting data of selected functions related to restaurant services, for controlling selected services and for creating a data base record of restaurant operations for data processing and analysis, for overview and improvement of the restaurant operations, comprising the steps of,
   a) interactively communicating between a customer location, or a server, or a central base unit;
   d) said step of interactively communicating includes the step of selecting a prerecorded message, or voice, or keyed messages for transmission to said third means central base unit or said second means;
   e) recording in a central base unit selected data responsive to said interactive communications, for processing of said selected data related to one or more selected restaurant services; and,
   f) connecting in a wide area network, a plurality of said central units displaced from each other at respective remote locations for data transfer of said selected data from said plurality of said central base units; and a wide area central processing unit for receiving, and for processing or analysis of, said selected data related to one or more selected restaurant services,
   and the steps of,
   storing or accessing standard indicative of standards for the time periods of table, or location occupancy, or for respective kinds of service requests or responses, or billing amounts, or kinds of food items ordered, or the numbers or frequency of communications between a customer communications unit, a server communications unit, a meal processing center communications unit, or a central management unit, by a respective central base unit, at one or more of said respective remote locations, and storing or accessing real time data from said one or more of said respective remote locations, indicative of said time periods of table, or said location occupancy or for said respective kinds of service requests or responses, or said billing amounts, or said kinds of food items ordered, or said number or frequency of communications from, between a customer communications unit, a server communications unit, a meal processing center communications unit, or a central management unit, by a respective central base unit, at said one or more of said respective remote locations.

15. The method of claim 14, including the step of comparison of one or more of said standards with said real time data arid producing data indicative of trends in said real time data.

16. The method of claim 15, including the step of producing indicative of at least a trend for at least one of said separate respective restaurant locations.

* * * * *